United States Patent
Wright et al.

(10) Patent No.: US 9,844,726 B2
(45) Date of Patent: Dec. 19, 2017

(54) GAMES ANALYTICS

(71) Applicant: deltaDNA Limited, Midlothian (GB)

(72) Inventors: Christopher Brian Wright, Midlothian (GB); Geoff Ballinger, Midlothian (GB); Laurie McCulloch, Midlothian (GB); James Prior, Midlothian (GB)

(73) Assignee: deltaDNA Limited, Midlothian (GB)

( * ) Notice: Subject to any disclaimer, the term of this patent is extended or adjusted under 35 U.S.C. 154(b) by 19 days.

(21) Appl. No.: 14/949,253

(22) Filed: Nov. 23, 2015

(65) Prior Publication Data

US 2016/0158652 A1 Jun. 9, 2016

Related U.S. Application Data

(60) Provisional application No. 62/087,579, filed on Dec. 4, 2014.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/69* | (2014.01) |
| *A63F 13/352* | (2014.01) |
| *A63F 13/30* | (2014.01) |

(52) U.S. Cl.
CPC .............. *A63F 13/69* (2014.09); *A63F 13/30* (2014.09); *A63F 13/352* (2014.09); *A63F 2300/535* (2013.01); *A63F 2300/5533* (2013.01)

(58) Field of Classification Search
CPC ............................ G07F 17/32; G07F 17/3239
See application file for complete search history.

(56) References Cited

U.S. PATENT DOCUMENTS

| | | | | |
|---|---|---|---|---|
| 9,317,993 | B2* | 4/2016 | Hardy | G07F 17/32 |
| 2002/0132656 | A1* | 9/2002 | Lydon | G06Q 10/06 463/9 |
| 2002/0187834 | A1* | 12/2002 | Rowe | G07F 17/32 463/42 |
| 2012/0150695 | A1 | 6/2012 | Fan et al. | |
| 2014/0248943 | A1 | 9/2014 | Burgin et al. | |

OTHER PUBLICATIONS

European Patent Office, Extended European Search Report for Application No. 15195891.5, dated May 19, 2016, 8 pages, Germany.

* cited by examiner

*Primary Examiner* — Kevin Y Kim
(74) *Attorney, Agent, or Firm* — Alston & Bird LLP

(57) ABSTRACT

A system for allowing intervention in a video game. The system is adapted to: receive a plurality of event data structures from on-line video games at certain pre-determined points during real time play, each event data structure including an event identification indicative of a pre-defined event, and a user identification uniquely associated with the user; analyze the event data structures to determine event based user information associated with each user; for each user, store the event based user information in a user database; receive requests from video games, each request being associated with a specific point in a specific game and a specific user; analyze information in the user database for each user from which each request originated to determine whether a response should be sent, if a response is needed, determine the response to be sent, and send the determined response to the specific game and specific user that requested it.

28 Claims, 4 Drawing Sheets

GAMES ANALYTICS

CROSS-REFERENCE TO RELATED APPLICATIONS

This application claims priority to and the benefit of U.S. Provisional Patent Application Ser. No. 62/087,579, filed Dec. 4, 2014; the contents of which as are hereby incorporated by reference in their entirety.

BACKGROUND

Technical Field

The present invention relates to a system and method for providing real time responses to video games, for example on-line video games or video games on a mobile device.

Related Art

On-line video games allow the possibility of user interactions in real time to enhance the game and improve user engagement. As the popularity of these games increases, the volume of on-line requests for information is increasing rapidly. As the number of interactions increase, the challenge of responding in real time becomes more difficult. Some attempts to solve this problem have been proposed, but most rely on merely increasing the processing power of the computers dealing with the requests.

BRIEF SUMMARY

According to the present invention, there is provided a system for allowing intervention in a video game, the system being configured to: receive a plurality of event data structures from video games at certain pre-determined points during real time play, each event data structure including an event identification, and a user identification; analyse the event data structures to determine event based user information associated with each user, the event based user information being indicative of user behaviour; store the event based user information in a user database; receive at least one request from at least one video game, each request being associated with a specific user and a specific point in a specific game; analyse the event based user information in the user database for each user from which each request originated to determine whether a response should be sent and if yes, the content of the response, and send the determined response to the specific game and the specific user that needs a response.

The system may be further configured to receive event data structures from video games at a first address and receive requests from video games at a second separate address. The first and second addresses are preferably URLs. By separating the channels for receiving event data and receiving requests, requests for information can be identified, prioritised and processed very quickly. This allows for a near real time response. This is important for game play as any form of delay is disruptive and so highly undesirable from a user perspective.

Alternatively, the system may be adapted or configured to receive the event data structures and the requests at a single address, but divert them to different addresses or channels for processing.

The system may be configured to analyse event information and store that information in near real time, as event data structures flow through the system, so that the user database provides an up-to-date view of user behaviour.

The event based user information may comprise at least one user metric. At least one user metric is stored in the user database.

The system may be adapted or configured to determine each response for each user as a function of information in the user database for that user.

The response may comprise a data structure that is adapted to be incorporated into the game being played, so as to change at least one parameter of the game.

Information relating to requests and/or responses for games being played by a user is stored in the user database for that user.

All information in the user database for a given user is linked by that user's user identification.

Each event data structure includes a timestamp indicative of a time associated with the event.

The event may be selected from any one or more of: first event sent; removal of game; type of client device; start of a game session; end of a game session; start of an in-game mission; failed state of a mission; a complete state of a mission; transaction between player and game or players; game achievement; game achievement reward; new level achieved; new level achieved reward; recordal of a message sent to invite another user; recordal of a message received and tracking of installation; recordal that a message has been sent; recordal that a message has been received; recordal that a gift has been sent; recordal that a gift has been received; recordal of demographic information on a user; recordal of a user posting to social network and reward, and tracks in-game messages delivered.

According to another aspect of the invention, there is provided a computer program product preferably on a computer readable medium adapted to communicate with a remote system, the computer program product comprising code or instructions adapted or configured to: implement an interactive computer game; send to the remote system event data structures at certain pre-determined points during real time game play, each data event structure including an event identification, and a user identification; send to the remote system request data structures at certain pre-determined points during real time game play, the request data structures including at least one request for information; receive a response from the remote processor, and implement the response during game play.

The response may include one or more game parameters and implementing the response may involve up-dating the game parameters during real time play. The response may include a message for presenting on screen during game play.

The computer program product may be adapted or configured to send the event data structures to a first address and send requests from video games to a second separate address. The first and second addresses are preferably URLs.

The computer program product may be adapted to send the event data structures to a first address and send requests from video games to a second separate address. The first and second addresses are preferably URLs.

According yet another aspect of the present invention, there is provided a method for allowing intervention in a video game, the method involving the steps of: receiving a plurality of event data structures from video games at certain pre-determined points during real time play, each event data structure including an event identification, and a user identification; analysing the event data structures to determine event based user information associated with each user, the event based user information being indicative of user behaviour; storing the event based user information in a user database; receiving at least one request from at least one video game, each request being associated with a specific user and a specific point in a specific game; analysing the event based user information in the user database for each user from which each request originated to determine whether a response should be sent and if yes, the content of the response, and sending the determined response to the specific game and the specific user that needs a response.

The method may involve receiving event data structures from video games at a first address and receive requests from video games at a second separate address. The first and second addresses are preferably urls.

Alternatively, the method may involve receiving the event data structures and the requests at a single address, but divert them to different addresses or channels for processing.

The method may involve analysing event information and storing that information in near real time, as event data structures flow through the system, so that the user database provides an up-to-date view of user behaviour.

The event based user information may comprise at least one user metric. At least one user metric is stored in the user database.

The method may involve determining each response for each user as a function of information in the user database for that user. The response may be derived from a data structure that is adapted to be incorporated into the game being played, so as to change at least one parameter of the game.

The method may involve storing information relating to requests and/or responses for games being played by a user in the user database for that user. All information in the user database for a given user is linked by that user's user identification.

Each event data structure generally includes a timestamp indicative of a time associated with the event.

The event may be selected from any one or more of: first event sent; removal of game; type of client device; start of a game session; end of a game session; start of an in-game mission; failed state of a mission; a complete state of a mission; transaction between player and game or players; game achievement; game achievement reward; new level achieved; new level achieved reward; recordal of a message sent to invite another user; recordal of a message received and tracking of installation; recordal that a message has been sent; recordal that a message has been received; recordal that a gift has been sent; recordal that a gift has been received; recordal of demographic information on a user; recordal of a user posting to social network and reward, and tracks in-game messages delivered.

BRIEF DESCRIPTION OF THE SEVERAL VIEWS OF THE DRAWINGS

Various aspects of the invention will now be described by way of example only and with reference to the accompanying drawings, of which.

DETAILED DESCRIPTION OF VARIOUS EMBODIMENTS

The system of the invention is designed to provide near real time responses into an online video game based on an individual player's behaviour. To use the system, the video games have to be adapted to send to the system user interaction data and requests for information in a very specific format. A typical use of the system is on Free to Play games, where players play the game for free and spend money to buy virtual items in the game. For Free to Play games, these responses make a change to the game play with the ultimate aim of increasing revenue through micro transactions made by the player. Generally, these games are designed to be completed for free. User can pay to speed up their progress or for vanity items that do not directly impact the gameplay. The system is designed to support game developers in targeting users with offers, incentives, variable difficulty, gameplay customisations all to help to keep users playing. This is done through a number of different strategies including tips, changing difficulty, rewarding and sale offers.

Figure 1:
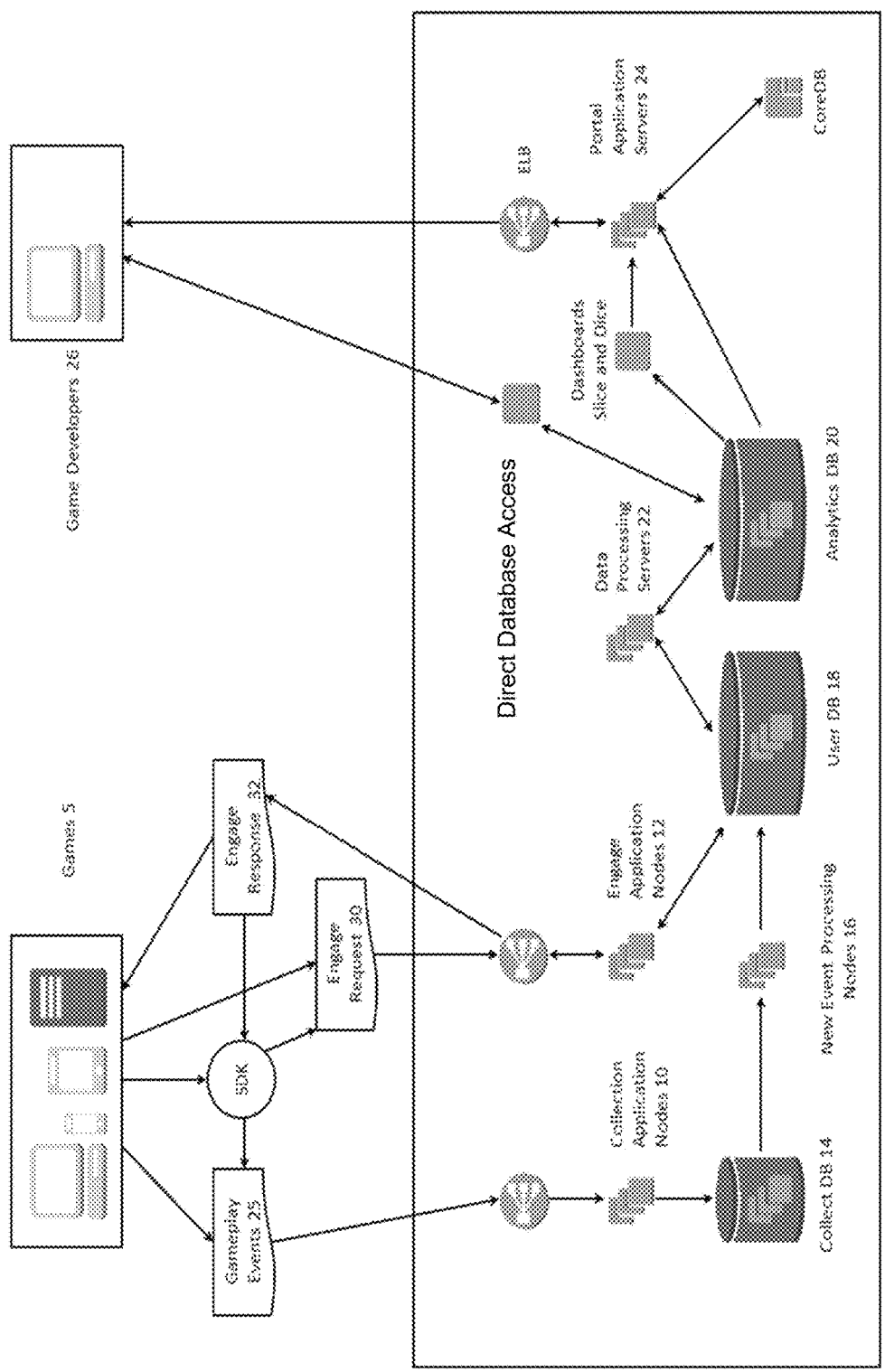
FIG. 1 is a block diagram of a system for intervening in on-line game play.

FIG. 1 shows the architecture of a platform in accordance with the invention for interacting with a video game 5. This has several applications, including a collect application 10 and an engage application 12. Each application resides on a single node or in a cluster of nodes. Connected to the collect application 10 is a collect database 14, which is in turn connected to a new event processing application 16. Both the new event processing application 16 and the engage application 12 are connected to a user database 18. Also provided is an analytics database 20. Connected to each of the user database 18, and the analytics database 20 are data processing servers 22 for processing data received from the collect and engage applications 10 and 12 respectively. Portal application servers 24 are also provided. These provide a unified environment that allows games developers 26 to access tools, design data collection, build and test models and deploy them into the engage application 12. The portal application servers 24 are connected to the analytics database 20.

The collect application 10 is the data collection system for collecting information on gameplay events 25 received from the game 5. Gameplay events 25 are asynchronous and do not need a response, but do need to be analysed and/or stored to build a user profile. Data collected from asynchronous gameplay events 25 for each game 5 is sent to the collect application 10. The location of the collect application 10 may be defined by a URL. The collect application 10 is designed to support very large numbers of events 25 and provide a level of both security and data integrity. The event structure is defined with a game semantic. This is important, because it gives an underlying data structure that allows a very high level of automation and reporting.

The collect application 10 is the single point of entry for all events 25. The collect application 10 passes incoming events 25 to the collect database 14. Events 25 are stored in the collect database 14, until they are sent to the new events processor 16 for processing. The collect database 14 has a single purpose which is to hold the events for a brief period until they are transferred downstream. An event id is assigned at this time to serve as a primary key. Columns are defined for the event id and the common mandatory attributes. Event-type specific attributes are held within a single field in, for example, JSON format. The collect database 14 contains minutes of events, as they are deleted as soon as they are processed by the new event processing application 16.

The collect application 10 is designed to support very large volumes of data at high speed. The data itself is generally extremely small, consisting of individual events that are preferably less than 1 kB—each representing a single in-game event. The collect application 10 supports millions of events 25 per second, and volumes exceeding a billion events per day. These events 25 allow tracking of specific player behaviours and actions that are important in understanding complex player behaviours. The collect application 10 is able to run multiple applications simultaneously. The collect application 10 can be implemented as one or more client applications or on one or more servers.

The engage application 12 is the messaging and personalisation component. Requests 30 that require a system response are sent from the game 5 to the engage application 12. Responses 32 are sent from the engage application 12 to the game 5. The location of the engage application 12 may be defined by a URL. The engage application URL is different from the collect application URL. The engage application 12 provides a mechanism to inform the game 5 of changes that should be made on an individual player level. These changes can be as simple as triggering an offer dialogue which presents a specific monetization offer to player at a point in the game, or it can be as complex as changes to the game level, which will alter the game experience on a player by player basis. The engage application 12 is designed to provide a near real-time response 32 to a game 5 based on player behaviour, and is able to use complex predictive models to identify and deliver personalized data back to the game. To optimise the near real time experience of users, the target response time is less than 100 ms from the initial request being received by the server.

The engage application nodes 12 include a plurality of models for predicting outcomes or responses to requests for information from the engage application based on user information. The models can be created manually or using machine learning. Manual creation of a model can be done by defining limits on a set of metrics that are combined together using logical functions. The system has an interface that provides a visualisation of the data to allow these models to be created through a point and click interface. Another approach is to use machine learning to allow the system to create the models. This is based on defining an objective and then allowing the system to build a set of rules that predict that behaviour. An example of the type of machine learning that can be used is Random Forest. The system must generate a model that is defined as a set of hard limits on the metrics. The machine learning algorithm is run on a daily basis, relearning and adapting the models to best fit the current data, giving the system the ability to adapt to changes in the player base and game structure. The models will be described in more detail later.

Events all have a basic structure. The top level data holds the following information: eventName is the name of the event (there is a plurality of pre-defined standard events—typically fifty or more—which are used for the majority of the analysis, but in addition each game can have a set of custom events); userID is a unique identifier that represents that user (this can be supplied by the game and external UserIDs such as the facebook ID or email could be used—if no ID is supplied the system will generate a unique ID); sessionID is a unique ID that is used within a single game session (a session is defined as the events between a gameStarted and gameEnded event); eventTimestamp is the time the event was generated (on a non-mobile game this is the time the event hits the collection server and is held in UTC; on mobile devices where the data may be held on the device for a period of time this is stamped with the local time generated on the device). EventParams is parameter data that holds the event specific information. These can, for example, be missionName if the event is a missionStarted event.

Each event is defined as a schema, for example a JSON schema, which represents that event. Each parameter of an event has settings for required, format and enumeration. The required setting defines if the parameter must be present, the format setting defines the structure of the data that must be supplied and the enumeration setting defines the exact data that must be supplied. This allows data to be very carefully defined and controlled. Data that does not meet this structure is rejected by the system.

A set of standard event types is defined that record common actions within a game, this includes game start, mission start and transaction events. Each of these has a set of standard fields related to the action that are required. An event can also have custom fields that can be game specific, this allows recording of game specific variables like resources of player health. It is also possible to have completely custom events that are game specific, recording actions that only occur in a specific or small subset of games. Each event is sent as an event data structure, for example a JSON structure. Each event is validated at the server to remove the possibility that incorrect data is held in the data warehouse. Examples of standard events are listed below. However, the events for each game can be extended by adding custom events that describe specific game functionality.

| Event code | Event Description |
| --- | --- |
| newPlayer | First event sent, recording installation of the game |
| gameRemoved | This records the game has been removed |
| clientDevice | Client level information such as the OS type |
| gameStarted | Defines a start of a game session |
| gameEnded | Defines the end of a game session |
| missionStarted | Start of an in-game mission |
| missionFailed | A failed state of a mission |
| missionCompleted | A complete state of a mission |
| Transaction | Records transaction between player & game or players |
| Achievement | Records achievement and resulting reward |
| levelUp | Records a new level achieved and the resulting reward |
| inviteSent | Records a message sent to invite another user |
| inviteReceived | Records message received and tracks the install |
| messageSent | Records a message has been sent |
| messageReceived | Records a message had been received |
| giftSent | Records a gift has been sent |
| giftReceived | Records a gift had been received |
| playerInfo | Records demographic information on a user |
| social | Records user posting to social network and reward |
| engagement | Tracks in-game messages delivered by engage |

The newplayer event is triggered by the server to identify that a version of the game 5 has been played for the first time. Facebook provides the functionality to identify game installs. This event should only ever be triggered once. The gameRemoved event is triggered by the server when a game is removed from a service like Facebook. This event should only ever be triggered once. The clientDevice event records information about the client device and should be triggered as soon as the information is available. This event should only ever be triggered once, and has various event parameters including deviceName; deviceType; hardwareVersion; manufacturer; operatingSystem; operatingSystemVersion; browserName and browserVersion.

The gameStarted event must be triggered at the start of each new session. If the information is available it must record the version number of each element of the game. The parameters for this event include clientVersion, dataVersion and serverVersion. The clientVersion number records the version of the client code, dataVersion records the latest data set a game is using and serverVersion records the version of the server the game is communicating with. The platform records the specific platform implementation a game is running on. The gameEnded event is triggered at the point a game session is completed. This event is often difficult to capture, this is because there is often not a simple clean way to close a game down.

The missionStarted event is triggered at the start of each mission and records the mission name and a unique ID for the mission. Ideally the mission name should be unique and recorded in human readable language, for example English, so information can be displayed easily. If the mission is a part of a tutorial, this should be recorded. The missionFailed event is triggered if a player fails to complete a mission. The mission name and mission ID should be recorded and also if possible the reason the mission failed. The missionAbandoned event is triggered if a player decided to abandon a mission to either try a different mission or retry the current mission. The missionCompleted event is triggered if a player completes a mission. If a player succeeds in completing a mission they can be rewarded, this reward can be given as money (either real or virtual), items or a combination of all three.

Custom events can be added on a game by game basis, these provide the ability to track specific actions on a game level. Each custom event is added to the list of potential events so custom events can be reused across games and can be moved into a standard event if it is being used repeatedly.

As event data structures flow through the system, the new events processor 16 parses and validates the event type specific attributes of each incoming event. This processing is delegated out of the collect application 10 itself, to keep the collect application 10 and its host as lightweight as possible to avoid any overhead/contention in additional processing before responding to a game logging an event.

After the event type specific attributes are validated, the data processing servers 22 and analytics database 20 are used to process each event to generate measurements or metrics on a user level. These measurements or metrics are inserted into the user database 18. The measurements or metrics stored in the user database 18 may be aggregated event based user information. For example, the user database 18 may store the number of times a game has been played. If a newly received event data structure indicates that a game session has just started for a particular game, the user database count of how many times the game has been played would be incremented by one. Since the majority of these metrics are updated as events arrive within the system, the user database 18 can provide an up-to-date view of the user behaviour through these metrics.

All events are stored on an event basis in the analytics database 20, so that the event information can be analysed down to the individual event level. The user metrics relate to the user's behaviour. Each metric is stored in the user database 18, against the user id, and records information about the player. These metrics are designed to define a player centric view of activity in the game. They also record information about the player's behaviour such as most popular mission, average session length and average health level. Metrics are calculated on a near real time and offline basis depending on the usage requirement of the metric.

In practice, hundreds of user metrics or measurements are calculated in real time from the event stream. Some examples of the types of measurements taken are:

totalDaysPlayed: A table exists within the user database that has a single row per day of play per user. As a new event comes in, the system checks if the event date already exists in this table. If not, it creates it and increments the user's daysPlayed metric by 1.

totalDaysPlayedLast7Days: After the previous metric has been updated, and if a new played day record was created, the system then counts the records in that user days played table, where the played date is within the last 7 days of the date of the event date. The totalDaysPlayedLast7Days metric for the user is then updated to that count.

sessionsPlayed: A table exists within the user database that has a single row per session of play per user. As a new event comes in, the system checks if the session id already exists in this table. If not, it creates it and increments the user's sessionPlayed metric by 1.

totalRealCurrencySpent: As a new event comes in, if the event indicates a spend of real currency, the totalRealCurrencySpent metric for the user is incremented by the amount indicated on the event by the system.

Each of these simple measurements can then be used to calculate more complex meta-measurements such as averages by combining and calculating measurements. Given the huge volume of requests being handled by the engage application 12 a key requirement is to discard user engage requests 30, which do not satisfy the model for any defined engagements as rapidly and efficiently as possible.

The data processing servers 22 and analytics database 20 are also configured to use event data to determine game metrics. These are measurements that are tied to a game id and not a player id. These metrics track the performance of the game over a period of time, recording information such as number of new players, revenue and average revenue per user. These metrics are generally used to understand the game performance over a period of time and can be used alongside a cohort of players to record the performance of a set of messages.

To use the system of the invention, games 5 have to be modified to include events that trigger the sending of event structures to the collect application or decision points at which requests 30 for information are sent to the engage application. Games developers 26 can create, display or update events through the portal application servers 24. This tracks changes to the event list and allows version control, whilst providing a single version of the event list at all times. This event list is used to validate the event structure received, as it is collected and is always therefore the valid and most recent version. This central control of the event list provides a mechanism for tracking and updating changes to the data being collected. All parties involved use one single event list in a simple and defined format that can then be implemented in the game.

Decision points are points where the game needs to make a decision and the game calls the engage application 12 with request 30 that includes a user ID and information indicative of the decision point. Responses 32 are determined at least in part based on the decision point from which the request originated. Hence, for every request 30, the engage application 12 needs to know the originating decision point. The response 32 can take numerous different forms, but could, for example, be to offer an item or change the difficulty of a level based on the player profile and previous behaviour. The response 32 is information that is returned to the game, and used by the game to effect a change in the gameplay. The change can be a message, a change to the store or a change in gameplay. The response 32 can also be used to drive external messaging systems such as e-mail, in game notification and ad servers. The response 32 is a structured response in, for example, the form of JSON. This can be interpreted by the game directly or used to deliver a message interface.

To allow interaction with the system, each client game 5 has to have code or instructions for causing event data structures to be sent to the collect application at certain pre-determined points during real time game play. Each data event structure has to include an event identification and a user identification. In addition, code or instructions are needed to cause requests to be sent to the engage application at certain pre-determined points during real time game play, and receive and implement responses from the engage application during game play. The game 5 may be adapted to buffer events, and only upload them at pre-determined points. This allows communication to happen at points when it will not interfere with the running of the game. This can be important in resource intensive games. Also if the network is unavailable, the game 5 may store the events, sending them the next time it is available.

Coding of the game 5 to interact with the system of the invention can be implemented in a number of ways, for example, an SDK could be used. In this case, the SDK could provide a simple interface for sending event level data and communicating through the collect application and the engage application. Typically, the SDK would hide the implementation details of the collect and engage calls. The SDK could be adapted to provide a set of standard methods to manage communication with the system. This is important if the game 5 is running on a device that does not have a permanent and reliable internet connection, such as a mobile device running on a 3G network. Where SDK's are used in the client game 5, they are provided in the native platform language to make integration as simple as possible. This means a number of SDK's are available for different device types, operating systems and frameworks.

In an engage call the client game 5, for example the SDK, will attempt to communicate with the engage server. If communication is not possible or the network delay is too long, the client game 5 may be adapted to return the last cached result. This is important for testing where the result will not change and the key thing is that the user gets a consistent experience.

To facilitate targeting and testing, the game 5 has to be structured in a certain way. This requires the game 5 to be built to allow data to drive key aspects of the game 5, the data can initially be based on pre-defined values but once deployed can be changed via the engage call to alter aspects of the game in real time. An example of this is a game 5 that has twenty levels where each level has a simple value that defines the difficulty of the level. This number could control the time to complete the level and/or the number of enemies in a level or similar things. Initially there is a pre-defined value that defines the difficulty for each level. Each time the level is started the game 5 uses that pre-defined value to set the difficulty. This simple approach makes building and tweaking the game easy since the game designer can quickly change the difficulty during development. Once the game 5 is complete targeting can be defined to provide the difficulty instead of using the pre-defined values, without requiring any change in the deployed game. This is a simple example of how applications can be data driven, using either local data or remote data driven by the engage call to change aspects of the application on the fly.

Interactive online video games 5 can be connected to the system via any internet enabled device, such as a tablet or mobile phone or PC. The system is designed to work as the player is progressing through the game. The system is configured to react to queries from the game, providing the best possible response at a given point based on the available data. Data is collected from a game 5 as a stream of events 25. Each event 25 represents a player action in the game 5. The actions are recorded as events, with each event representing a clearly defined step in the player's journey. Each event 25 includes as standard the event name, user id, timestamp when the event was recorded and a session id that links together events in the same gameplay session. Event data is collected and the player centric measurements are generated from the data stream. These player measurements or metrics define the player's current state and can then be used to define the appropriate response.

Figure 2:
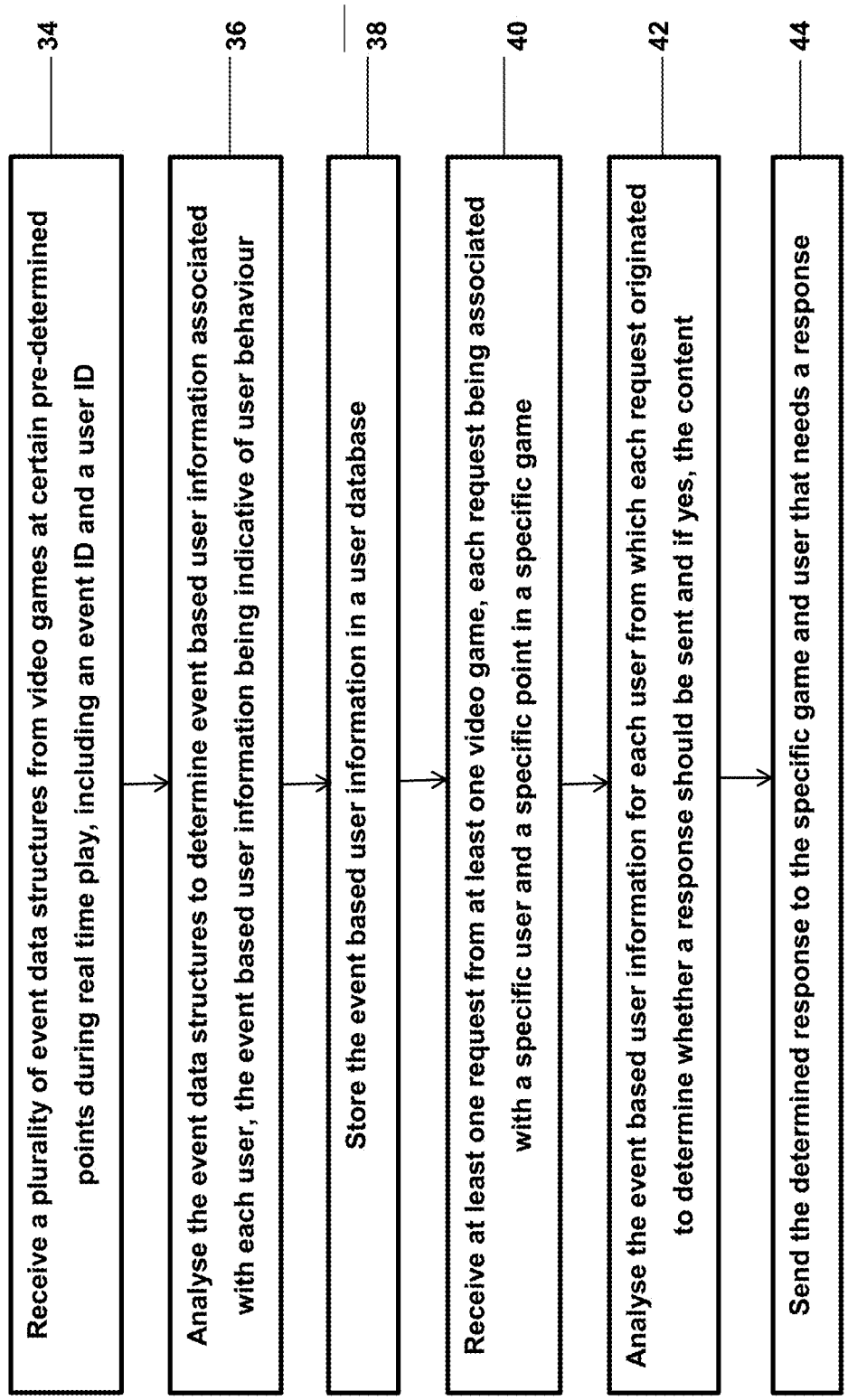
FIG. 2 is a flow diagram of a method of use of the system of FIG. 1.

FIG. 2 shows the steps taken in use of the system of FIG. 1. As the player plays the game they generate events 25. Each event 25 may be a specific JSON structure that defines an action the player has taken. This will generally follow a sequence of gameplay which forms a game session. Game sessions are started and ended with a gameStarted and gameEnded event. Between these two events, the player will drive a number of other actions that will generate events. These can be starting a mission, gaining an achievement, levelling up or making a transaction. Each of these generates a related event. Some events 25 can be complex with multiple nested structures. The event data is sent directly to the system using a standard internet protocol such as http. Sent with the event is an identifier associated with the game from which it originated. As each event is received and collected 34, it is processed and the data within the event is analysed, as described above, to build a better picture of the player's behaviour 36. User metrics resulting from this analysis are stored in the user database 38.

At decision points, a request 30 is made based on a user identifier. This request 30 is received 40 at the platform in the form of a call to the engage application 12 and must be answered rapidly, for example within one second, or the game will progress and the possibility to make a response will be lost. The engage call passes a specific parameter representing a decision point. This informs the platform where in the game the call is being made. Sent with the engage call 30 is an identifier for identifying the game from which the call originates. Also, Realtime parameters related to the user, such as account balance, may be sent alongside the engage call 30. This ensures that the system's knowledge of the user is as up-to-date as possible. Realtime parameters deliver to the system the current state of the user at the point when the engage call 30 is made. These give a snapshot of the player's current status and are used to deliver information such as current balance, experience and the last mission attempted.

Figure 3:
FIG. 3 shows an example a screen that may be presented to users during on-line game play.
Figure 4:
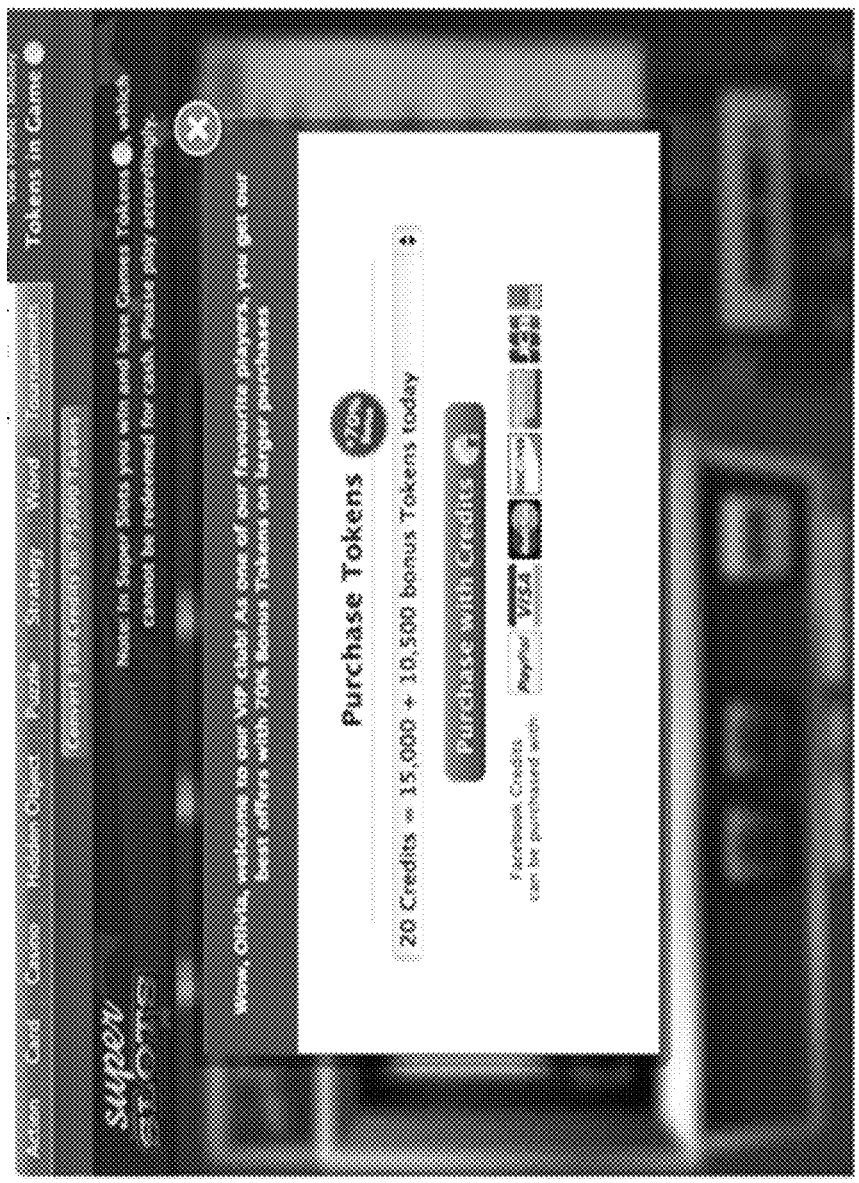
FIG. 4 shows another example a screen that may be presented to users during on-line game play.

At any decision point there can be multiple models that will evaluate against an engage call 30. The results of these models may be used to define responses that are passed back to the game 42. Responses may include game parameters for changing game play or messages for presenting on screen to a user. Examples of messages that the player would see based on engage are shown in FIG. 3 and FIG. 4. The system evaluates the engage request 30 and delivers back to the game via the engage application 12 the most appropriate response 32 based on the player's behaviour 44. This is done via the URL from which the original request was sent. At any specific decision point there can be a number of different models that the system would need to evaluate. The models have a set of rules of engagement that define the priority order at a specific decision point and the number of messages that can be delivered to a user. The combination of the results of the model and the rules of engagement define the response that will be made to the user based on the call and a single response is delivered back to the game within the required time constraint. The models and rules of engagement will be described in more detail later.

To assess the effectiveness of the system, a cohort of users may be held in a control group of a chosen size, for example 10% of the user base. These users are not messaged as part of the process. These users are used to determine the success or failure of the responses. The results of the messaging are reported through a set of charts that display the impact of each model on a number of game metrics. These charts review of the uplift generated by the messaging by comparing the messaged users to a control group of non-messaged users. They also show the number and composition of the users in the messaged group.

The models are used to define a selection of players based on their player metrics. The models define a set of criteria that are used to isolate those users that are exhibiting or are expected to exhibit a specific behaviour. The predictive models define a set of limits on metrics and logical functions that combine these limits. The system specifically takes the model in this form and evaluates it in real time. This then allows a custom response to be sent to those players that meet the specific criteria. Each statistical model is held in a structure that allows the model evaluation to be completed as quickly as possible. A user id is used to trigger a model evaluation. The model evaluation is designed to complete as quickly as possible with fall out points so models can exit as soon as possible to reduce processing and deliver the response rapidly. By using a combination of model priority, rules of engagement and model evaluation it is possible to quickly evaluate the available models for a user and return the desired result.

Each model has three parts: selection, content, and conversion event. The selection defines which requests the model will potentially be selected for and comprises one or more game decision points, a start date, an optional end date, an optional restriction to new users, a set of constraints on aggregates in the user database, and constraints on parameter values in the request. Optional sticky behaviour may be specified. By this it is meant that, once initially allocated to a specific cohort associated with a specific model, a user will always be selected with respect to all but the start and end date constraints (as the start and end dates define when the user is in or out of the allocated cohort). The content has one or more variants, each of which applies to a certain proportion of the total users selected for the engagement, the total of which is always 100%. Each variant optionally comprises a set of game parameters with defined values, and an optional message sequence. The message sequence contains one or more steps with defined minimum time delays between steps, and optionally a minimum time delay from the last step back to the first step. Each step in the message sequence carries an optional message and heading texts, and an optional further set of game parameters with defined values and the parameter value constraints. The conversion event, which is optional is defined as a named event data structure with an optional set of constraints on the specific parameter values therein.

Every decision point in every game is associated with its own group of models that have to be run to determine the response that should be sent to a user. The ability to provide responses very quickly is critical for interactive games. To help achieve this, the system uses a process of filtering, with the objective of coming to a decision as quickly as possible based on the smallest amount of information required. This is supported by a cohort state in the user database which records if a user has previously been assigned to a variant for each model. The filtering is done in a number of stages, each of which potentially reduces the list of applicable models. Firstly, only models for the game decision point associated with the engage request are considered. Then, time based filtering is applied based on time constraints defined within each model. For example, the start and end date for each model, and the effective (timezone corrected) current time are considered. Any model with constraints that do not match the date and time of the engage request is excluded. Some models are restricted to apply only to new users of a game. For these models, the time of user creation is compared with the time of the model creation. If the user was already actively using the game prior to creation of the model, then the model is excluded. If the user started playing the game for the first time after creation of the model, then the model is included.

Next, it is determined whether the user is permanently allocated to a specific cohort associated with a specific model. If yes, any variant associated with the cohort is identified, and the same variant is used. If a user is not permanently allocated to a specific cohort, the system determines whether the user is in any current exclusive cohort. If yes, then other exclusive behaviour models are excluded. This is because the system requires that users can only be in one exclusive cohort at a time. Any model whose constraints are not satisfied with respect to parameters included with the engage request is excluded. Next constraint satisfaction is evaluated with respect to aggregates/metrics in the user database. Any models which fail are excluded. For example, if a model requires that the user game level has to be greater than 10 and the user metrics show that the user has achieved a game level below 10, then the model is excluded. For the remaining, non-excluded models, if the user is already in a cohort for the model the same variant is used, otherwise one is chosen randomly based on the required user proportions and the cohort is recorded. For variants with a message sequence, message delivery is considered. If the variant is newly chosen then the first message is used, otherwise if the time elapsed since the previous message was used is greater than the required time delay then the next message is used, otherwise no message is used.

Once the decision point models are filtered, and only relevant models remain, rules of engagement are applied. The highest priority model variant is used to create the response. Message texts are only used if any defined limits for messages per day, week and month have not yet been reached. The response is then sent to the game. If a message is included in the response, then the message is display. If gameplay parameters are included, these are then incorporated into the game and gameplay continues.

The invention can be performed by one or more programmable processors executing a computer program to perform functions by operating on input data and generating output. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

The invention claimed is:

1. A system for allowing intervention in a video game, the system comprising:
   at least one memory storage area containing at least a user database; and
   at least one computer processor,
   wherein the at least one computer processor is configured to:
      receive a plurality of event data structures from on-line video games at certain pre-determined points during real time play of the video games by at least one user, each event data structure including an event identification indicative of a pre-defined event, and a user identification uniquely associated with the user;
      analyze the event data structures to determine event based user information associated with the user;
      for each user, store the event based user information in the user database;
      receive requests from video games, each request being associated with a specific point in a specific game and a specific user, the specific point being a decision point where the video games need to make a decision, and each request being generated during substantially real time game play;
      analyze information in the user database for each user from which each request originated to determine whether a response should be sent, during the substantially real time game play, to the game being played,
      if a response is needed, determine the response to be sent at least in part based on information in the user database for the user and the decision point from which the request originated, wherein the response comprises information that is to be returned to the game, the information being configured to, via automatic processing thereof by the game, effect a change in the game during the substantially real time game play, and
      send, during the substantially real time game play, the determined response to the specific game and the specific user from which the request originated, so as to effect the change in the game automatically and during the substantially real time game play.

2. A system as claimed in claim 1, wherein the at least one computer processor is further configured to receive the event data structures from the on-line video games at a first address and receive the requests from the video games at a second separate address.

3. A system as claimed in claim 2, wherein the first and second addresses are URLs.

4. A system as claimed in claim 1, wherein the at least one computer processor is further configured to analyze the event data structures to determine event based user information and store that information in near real time, so that the user database provides a near real time view of user behaviour.

5. A system as claimed in claim 1, wherein the at least one computer processor is further configured to determine at least one user metric using the event based user information and store the at least one user metric in the user database.

6. A system as claimed in claim 5, wherein the at least one computer processor is further configured to update at least one of the event based user metrics in real time during game play.

7. A system as claimed in claim 1, wherein each response comprises a data structure that is adapted to be incorporated into the game being played so as to change at least one parameter of the game.

8. A system as claimed in claim 1, wherein information relating to requests received from and/or responses sent to any one or more games being played by a user is stored in the analytics database.

9. A system as claimed in claim 1, wherein all information in the user database for a given user is linked by that user's user identification.

10. A system as claimed in claim 1, wherein each event data structure includes a timestamp indicative of a time associated with the event.

11. A system as claimed in claim 1, further comprising a plurality of models that are usable to determine whether a response should be sent and if yes the nature of the response to be sent.

12. A system as claimed in claim 11, wherein the at least one computer processor is further configured to store a sub set of said plurality of models in association with each specific decision point in each game, so that each decision point is linked with a subset of the stored models.

13. A system as claimed in claim 11, wherein the at least one computer processor is further configured to select one or more of the plurality of models to determine whether a response should be sent and if yes the nature of the response to be sent.

14. A system as claimed in claim 13, wherein the one or more of the plurality of models is selected based on at least one of a priority rating, overlap with any other selected model and periodic message limits.

15. A system as claimed in claim 1, wherein the at least one computer processor is further configured to use defined conversion events to track conversion of models with respect to a particular user during analysis of the event data structures.

16. A system as claimed in claim 1, wherein the at least one computer processor is further configured to filter requests to identify those for which a response is not needed.

17. A system as claimed in claim 1, wherein the at least one computer processor is further configured to validate the structure of each event data structure received to ensure each event data structure is of a required, predetermined form.

18. A computer program product comprising at least one non-transitory computer readable storage medium configured to interact with the system of claim 1.

19. A method for allowing intervention in a video game, the method comprising the steps of:
   receiving a plurality of event data structures from video games at certain pre-determined points during real time play of the video games by at least one user, each event data structure including an event identification, and a user identification;
   analyzing, via one or more computer processors, the event data structures to determine event based user information associated with the user, the event based user information being indicative of user behaviour;
   storing the event based user information in a user database;
   receiving at least one request from at least one video game, each request being associated with a specific user and a specific point in a specific game, the specific point being a decision point where the game needs to make a decision, and each request being generated during substantially real time game play;

analyzing, via the one or more computer processors, the event based user information in the user database for each user from which each request originated to determine whether a response should be sent to the game being played by the user during substantially real time play and if yes, the content of the response, the content of the response being determined at least in part based on information in the user database for the user and the decision point from which the request originated, wherein the response comprises information that is to be returned to the game, the information being configured to, via automatic processing thereof by the game, effect a change in the game during the substantially real time game play, and sending, via the one or more computer processors and over a network and during the substantially real time game play, the determined response to the game and the user, so as to effect the change in the game automatically and during the substantially real time game play.

20. A method as claimed in claim 19, further comprising the steps of:

receiving event data structures from video games at a first address; and receiving requests from video games at a second separate address.

21. A method as claimed in claim 19, further comprising the steps of:

receiving the event data structures and the requests at a single address; and diverting the event data structures and the requests to different addresses or channels for processing.

22. A method as claimed in claim 19, further comprising the step of g analyzing event information and storing that information in near real time, as event data structures flow through the system, so that the user database provides an up-to-date view of user behaviour.

23. A method as claimed claim 22, wherein the event based user information may comprise at least one user metric.

24. A method as claimed in claim 19 wherein the response comprises a data structure that is adapted to be incorporated into the game being played, so as to change at least one parameter of the game.

25. A method as claimed in claim 19 further comprising the step of storing information relating to requests and/or responses for games being played by a user in the analytics database.

26. A method as claimed in claim 19, wherein the event is selected from at least one of: first event sent; removal of game; type of client device; start of a game session; end of a game session; start of an in-game mission; failed state of a mission; a complete state of a mission; transaction between player and game or players; game achievement; game achievement reward; new level achieved; new level achieved reward; recordal of a message sent to invite another user; recordal of a message received and tracking of installation; recordal that a message has been sent; recordal that a message has been received; recordal that a gift has been sent; recordal that a gift has been received; recordal of demographic information on a user; recordal of a user posting to social network and reward, and tracks in-game messages delivered.

27. A computer program product comprising at least one non-transitory computer readable storage medium configured to implement the method of claim 19.

28. A computer program product comprising at least one non-transitory computer-readable storage medium having computer-readable program code portions embodied therein, the computer-readable program code portions comprising at least one executable portion configured to:

implement an interactive computer game;

send to the remote system event data structures at certain pre-determined points during real time game play, the pre-determined points being decision points where the game needs to make a decision, each data event structure including an event identification and a user identification;

send to the remote system request data structures at certain pre-determined points during real time game play, the request data structures including at least one request being associated with a specific point in a specific game with a specific user;

receive a response from the remote processor during substantially real time play, and automatically implement the response during real time game play to effect a change in the gameplay during the substantially real time play.

* * * * *